M. HUTH.
ANODE AND PROCESS OF MANUFACTURING THE SAME.
APPLICATION FILED NOV. 22, 1910.

1,043,937.  
Patented Nov. 12, 1912.

Witnesses:  
H. C. Workman  
Ray J. Ernst

Max Huth  
Inventor

UNITED STATES PATENT OFFICE.

MAX HUTH, OF CHARLOTTENBURG, GERMANY, ASSIGNOR TO SIEMENS & HALSKE A. G., OF BERLIN, GERMANY, A CORPORATION OF GERMANY.

ANODE AND PROCESS OF MANUFACTURING THE SAME.

1,043,937.

Specification of Letters Patent.   Patented Nov. 12, 1912.

Application filed November 22, 1910. Serial No. 593,643.

*To all whom it may concern:*

Be it known that I, MAX HUTH, a subject of the German Emperor, and residing at Charlottenburg, near Berlin, Germany, have invented a certain new and useful Improved Anode and Process of Manufacturing the Same, of which the following is a specification.

My invention relates to the manufacture of peroxid of manganese anodes.

When electrolyzing aqueous solutions of salts, as e. g. solutions of sulfate of zinc, nitrate of copper and the like, it has been preferable, particularly when free acid is present, to employ an unattackable anode, e. g. in the form of massive blocks of chemically pure peroxid of manganese, because detrimental contamination of the electrolyte is avoided with certainty by means of the same. Such anodes have however the disadvantage that they are relatively bad conductors of electricity and a primary object of my invention is to remedy this defect and to provide massive anodes of the kind described which are relatively good conductors of electricity.

My invention is illustrated in the accompanying drawing in which—

Figure 1:
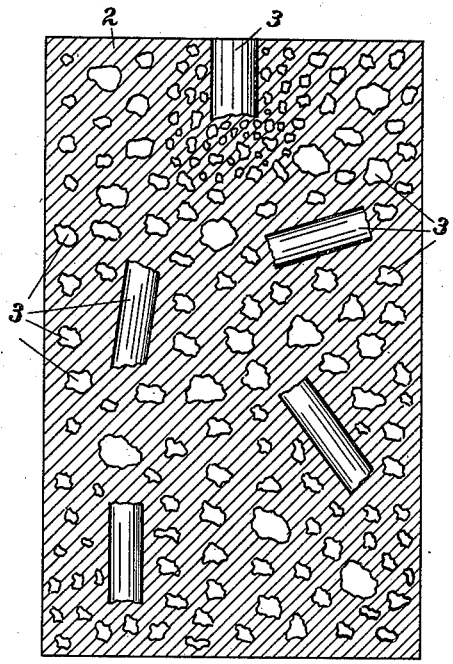
Figure 3:
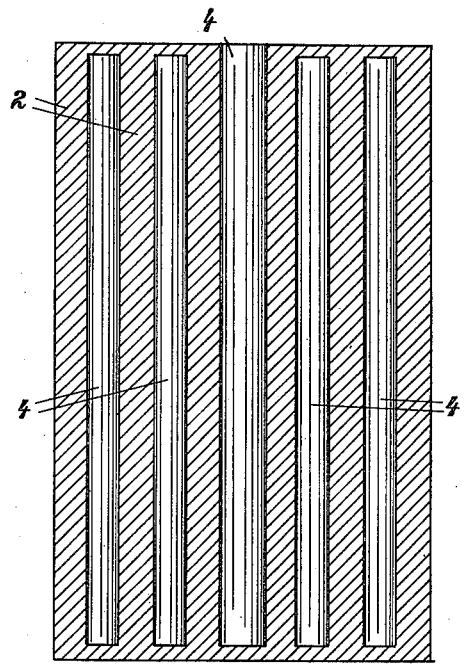
Figure 2:
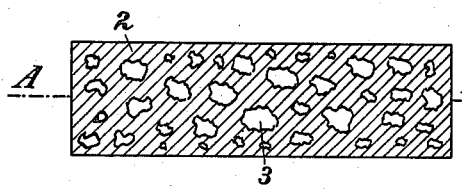
Figure 4:
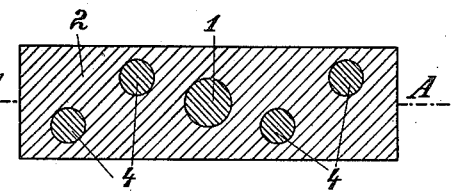

Figure 1 is a longitudinal section through an anode on line A—A in Fig. 2. Fig. 2 is a transverse section of said anode. Fig. 3 is a longitudinal section of an anode taken on line A—A of Fig. 4. Fig. 4 is a transverse section of the anode illustrated in Fig. 3.

For carrying out my invention, I unite peroxid of manganese anodes with good conductors composed of peroxid of lead. I do this by embedding pieces or rods of peroxid of lead, which, as is known, could not heretofore be made in the form of plates or blocks in pure nitrate of manganese or in a mixture of crystallized peroxid of manganese and nitrate of manganese, then mechanically pressing the entire mass thus obtained in molds and finally heating the same. Owing to the heat the nitrate of manganese is converted into peroxid of manganese, azotic oxids being separated.

In the drawings are shown two forms of anodes illustrating my invention.

In Figs. 1 and 2 the crystalline mass of manganese peroxid forming the body of the anode is indicated by the numeral 2. Embedded in said mass of crystalline manganese peroxid are pieces 3 of any desired or convenient form, of lead peroxid.

In Figs. 3 and 4 the pieces of embedded lead peroxid are shown in the form of rods indicated by numeral 4.

In both examples of electrodes illustrated the peroxid of lead and the peroxid of manganese are united in a single solid block. Terminal connections to these electrodes for the circuit conductors or wires may be made in any suitable way. Since the current entering the electrode can only partly flow through the poorer-conductive peroxid of manganese it flows for the greater part through the good conductive rods or pieces of lead peroxid and thus the total resistance of the electrode is correspondingly small. In this manner the mechanically embedded peroxid of lead conductors are intimately united with the peroxid of manganese mass, so that the desired increase in conductivity of the peroxid of manganese anodes is obtained.

I claim:—

1. An anode consisting of a solid block of crystalline peroxid of manganese having embedded therein pieces of electrically conductive lead peroxid.

2. The herein described process of manufacturing peroxid of manganese anodes which consists in inserting pieces of lead peroxid in a mass composed of nitrate of manganese, pressing the mass in a mold, heating the same and removing the body thus obtained from the mold.

3. The herein described process of manufacturing peroxid of manganese anodes, which consists in inserting rods of peroxid of lead into a mass composed of nitrate of manganese and crystalline peroxid of manganese, in pressing the same into a mold, in then heating the same, and in removing the body thus obtained from the mold.

In testimony whereof I have signed my name to this specification in the presence of two witnesses.

MAX HUTH.

Witnesses:
 WALDEMAR HAUPT,
 HENRY HASPER.